[22.]

DANIEL DAVIS.
Improvement in Wheel Hubs for Vehicles.

No. 118,589.             Patented Aug. 29, 1871.

Witnesses.
Henry T. Brown
J. W. Coombs

Daniel Davis

UNITED STATES PATENT OFFICE.

DANIEL DAVIS, OF NEW YORK, N. Y., ASSIGNOR TO THE DAVIS PATENT HUB AND WHEEL COMPANY, OF SAME PLACE.

IMPROVEMENT IN WHEEL-HUBS FOR VEHICLES.

Specification forming part of Letters Patent No. 118,589, dated August 29, 1871.

*To all whom it may concern:*

Be it known that I, DANIEL DAVIS, of the city, county, and State of New York, have invented a new and useful Improvement in Wheel-Hubs; and I do hereby declare that the following is a full, clear, and exact description of the same, reference being had to the accompanying drawing.

Figure 2:
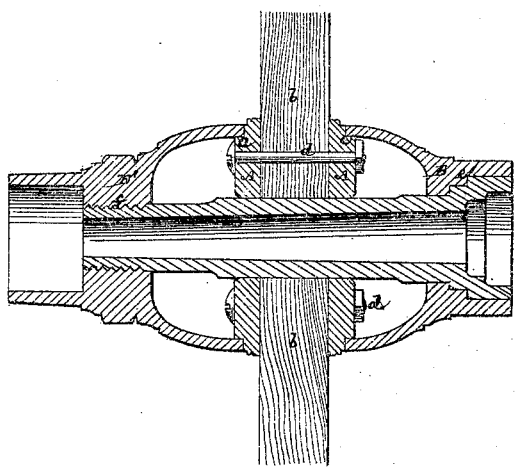
Figure 1:
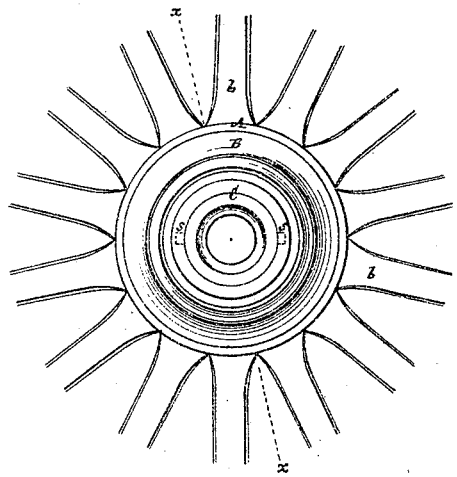
Figure 4:
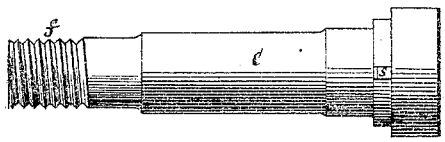
Figure 3:
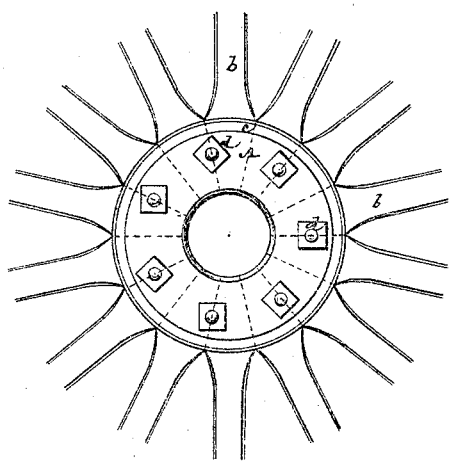

Figure 1 represents a side view of a wheel-hub constructed in accordance with the invention, and having the spokes of the wheel fitted thereto. Fig. 2 is a sectional view of the same taken in the direction of the length of the axis, as indicated by the line $x\ x$. Fig. 3 is a side view with the axle-box and outer-shell portions of the hub removed, and Fig. 4 a longitudinal view of the axle-box detached.

Similar letters of reference indicate corresponding parts throughout the several figures.

My invention relates to the construction of hubs for wheels of wagons and other vehicles, mainly of a light description; and has for its objects neatness and strength, together with a secure retention of the spokes and facility of fitting together and taking apart the several or leading portions. The invention consists in a combination, with annularly-recessed clamping-plates that hold the spokes in between them, of opposite shell portions that fit the annular recesses of the clamping-plates outside the bolts by which the spokes are secured, and the axle-box of the hub constructed to draw, as a bolt, said shells up against the clamping-plates, all substantially as hereinafter described.

Referring to the accompanying drawing, A A represent the metal clamping-plates, which serve to receive the spokes $b\ b$ in between them, and that hold the same to their places by means of bolts and nuts $d\ d$, as in other hubs. These plates, however, have each an annular recess, $c$, formed in their exterior outside of or beyond the fastenings $d\ d$. Within these annular recesses, so as to bear up against the shoulders formed by the latter, are slid or fitted metal shells B B' that answer several purposes or functions; thus, they give neatness and finish to the hub and serve to conceal the fastenings $d\ d$, and have a centering and supporting action generally. The one, B, of these shells is stepped or recessed internally at its outer end portion, as at $e$, to receive a correspondingly-stepped head or swelled portion of the axle-box C that, passing through said shell and through the clamping-plates A A, is secured at its opposite end by the other shell, B', which fits as a nut on a screw-thread, $f$, formed in or on said end of the box. The axle-box C is prevented from turning when screwing on or off the shell B by studs or feathers $s\ s$ arranged to enter recesses in the shell B.

By the construction and arrangement of the parts as described the shells, clamping-plates, and axle-box have not only a centering action with one another, but form a mutual support, and when screwing up the shell B' the bolts $d\ d$ are released of much strain, and the clamping-plates and shells, by the fit of the latter within the shoulders of the former, made to stiffen one another not only in directions parallel to the axis, but likewise radially or at right angles thereto. The concealment of the several fastenings all within the hub and general configuration of the shells B B' also give a neatness and finish, as hereinbefore referred to.

What is here claimed, and desired to be secured by Letters Patent, is—

The combination of the shells B B', the clamping-plates A A formed with annular recesses $c\ c$ to receive and support the inner ends of the shells outside of the bolts $d\ d$ that hold the spokes to their places, and the axle-box C arranged to bind as a screw-bolt said shells and clamping-plates together, substantially as specified.

DANIEL DAVIS.

Witnesses:
HENRY T. BROWN,
JOHN W. COOMBS.